United States Patent
Chan et al.

(10) Patent No.: US 9,064,061 B2
(45) Date of Patent: Jun. 23, 2015

(54) METHOD AND SYSTEM FOR HOT PLUGGING DETECTION OF A VIDEO CONNECTOR IN A COMPUTER DEVICE

(75) Inventors: Shany-I Chan, Taipei (TW); Yu-Kuo Chiang, Taipei (TW); Shih-Da Wu, Taipei (TW); Patrick Beaulieu, Santa Clara, CA (US); William S. Herz, Hayward, CA (US); Li-Ling Chou, Zhonghe (TW); Ching-Yee Feng, Xindian (TW)

(73) Assignee: NVIDIA CORPORATION, Santa Clara, CA (US)

( * ) Notice: Subject to any disclaimer, the term of this patent is extended or adjusted under 35 U.S.C. 154(b) by 1066 days.

(21) Appl. No.: 12/135,079

(22) Filed: Jun. 6, 2008

(65) Prior Publication Data

US 2009/0307382 A1 Dec. 10, 2009

(51) Int. Cl.
   *G06F 3/00* (2006.01)
   *G06F 13/40* (2006.01)
   *G09G 5/00* (2006.01)

(52) U.S. Cl.
   CPC ............ *G06F 13/4081* (2013.01); *G09G 5/006* (2013.01); *G09G 2320/08* (2013.01); *G09G 2380/02* (2013.01)

(58) Field of Classification Search
   USPC .................................................. 710/17, 302
   See application file for complete search history.

(56) References Cited

U.S. PATENT DOCUMENTS

| 6,232,678 | B1 * | 5/2001 | Murata ........................ 307/130 |
| 6,697,033 | B1 * | 2/2004 | Leung et al. ...................... 345/5 |
| 6,928,543 | B2 * | 8/2005 | Hendry et al. ................ 713/100 |
| 7,053,864 | B1 * | 5/2006 | Lee ................. 345/3.4 |
| 7,190,191 | B1 * | 3/2007 | Mathur et al. .................. 326/68 |
| 2004/0252246 | A1 * | 12/2004 | Lee ................ 348/725 |
| 2006/0245725 | A1 * | 11/2006 | Lim ............................... 386/95 |
| 2007/0121020 | A1 * | 5/2007 | Ichimura ...................... 348/739 |
| 2008/0165202 | A1 * | 7/2008 | Brodersen et al. ............ 345/581 |

FOREIGN PATENT DOCUMENTS

| TW | I240559 | 9/2005 |
| TW | I249720 | 2/2006 |
| TW | I257254 | 6/2006 |
| TW | I322569 | 4/2008 |

OTHER PUBLICATIONS

"Wikipedia :S-Video", Jul. 3, 2007 http://en.wikipedia.org/w/index.php?title=S-Video&oldid=142189017.*

* cited by examiner

*Primary Examiner* — Chun-Kuan Lee
(74) *Attorney, Agent, or Firm* — Artegis Law Group, LLP

(57) ABSTRACT

A method and system are implemented to instantaneously detect a hot plugging of a video connector in a computer device by detecting a change in the electrical state of one ground pin of the video connector. The computer device comprises a video connector having at least two ground pins, a processing unit, and a hot-plugging detection circuit coupled between the processing unit and one of the ground pins of the video connector, wherein the hot-plugging detection circuit is configured to detect a hot plugging of the video connector based on a change in voltage potential of the ground pin.

20 Claims, 6 Drawing Sheets

METHOD AND SYSTEM FOR HOT PLUGGING DETECTION OF A VIDEO CONNECTOR IN A COMPUTER DEVICE

BACKGROUND OF THE INVENTION

1. Field of the Invention

The present invention relates to a graphics system capable of detecting the connection of a television set, and more particularly, to a graphics system employing a ground pin of a connector for detecting the connection/disconnection of the television set.

2. Description of the Related Art

Unless otherwise indicated herein, the approaches described in this section are not prior art to the claims in this application and are not admitted to be prior art by inclusion in this section.

Currently commercialized computer systems may be provided with one or more video connectors for coupling with a TV display. If the TV display is plugged into the video connector while the computer system is turned off, the computer system after being powered on will automatically detect the presence of the TV display. On the other hand, if the TV display is plugged into the video connector while the computer system is turned on, rebooting of the computer system is usually necessary to have the presence of the TV display detected, which may be cumbersome and waste time. In one approach to overcome this issue, the detection of the hot plugging of the TV display may be made through some plug-and-play firmware provided in the computer system. However, this approach requires extra software design and pre-installation.

What is needed in the art is thus a method and system that are able to instantaneously detect the hot plugging of a video connector, and address at least the problems set forth above.

SUMMARY OF THE INVENTION

The present application describes a method and systems that are able to detect a hot plugging of a video connector in a computer device by detecting a change in the electrical state of one ground pin of the video connector. Specifically, one embodiment of the present invention sets forth a computer device that comprises a video connector, a processing unit, and a hot plugging detection circuit coupled between the processing unit and a ground pin of the video connector, wherein the hot-plugging detection circuit is configured to detect a hot plugging of the video connector based on a change in voltage potential of the ground pin.

In another embodiment, a method for hot-plugging detection of a video connector provided in a computer device is disclosed. The method comprises coupling a ground pin of the video connector to a hot-plugging detection circuit, and detecting the hot plugging of the video connector based on a change in an electrical state of the ground pin.

At least one advantage of the present invention disclosed herein is the ability for the computer device to detect the hot plugging of a video connector without requiring computer rebooting or software detection or any connector modification.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present application describes a method and system that are able to instantaneously detect a hot plugging of a video connector in a computer device by detecting a change in the electrical state of one ground pin of the video connector. Features of the invention described herein may be applicable for diverse types of video connectors such as S-Video, and High Definition TV (Component) connectors. More generally, the present invention may be suitable for detecting the hot plugging of any video connectors having more than two ground pins.

Figure 1A:
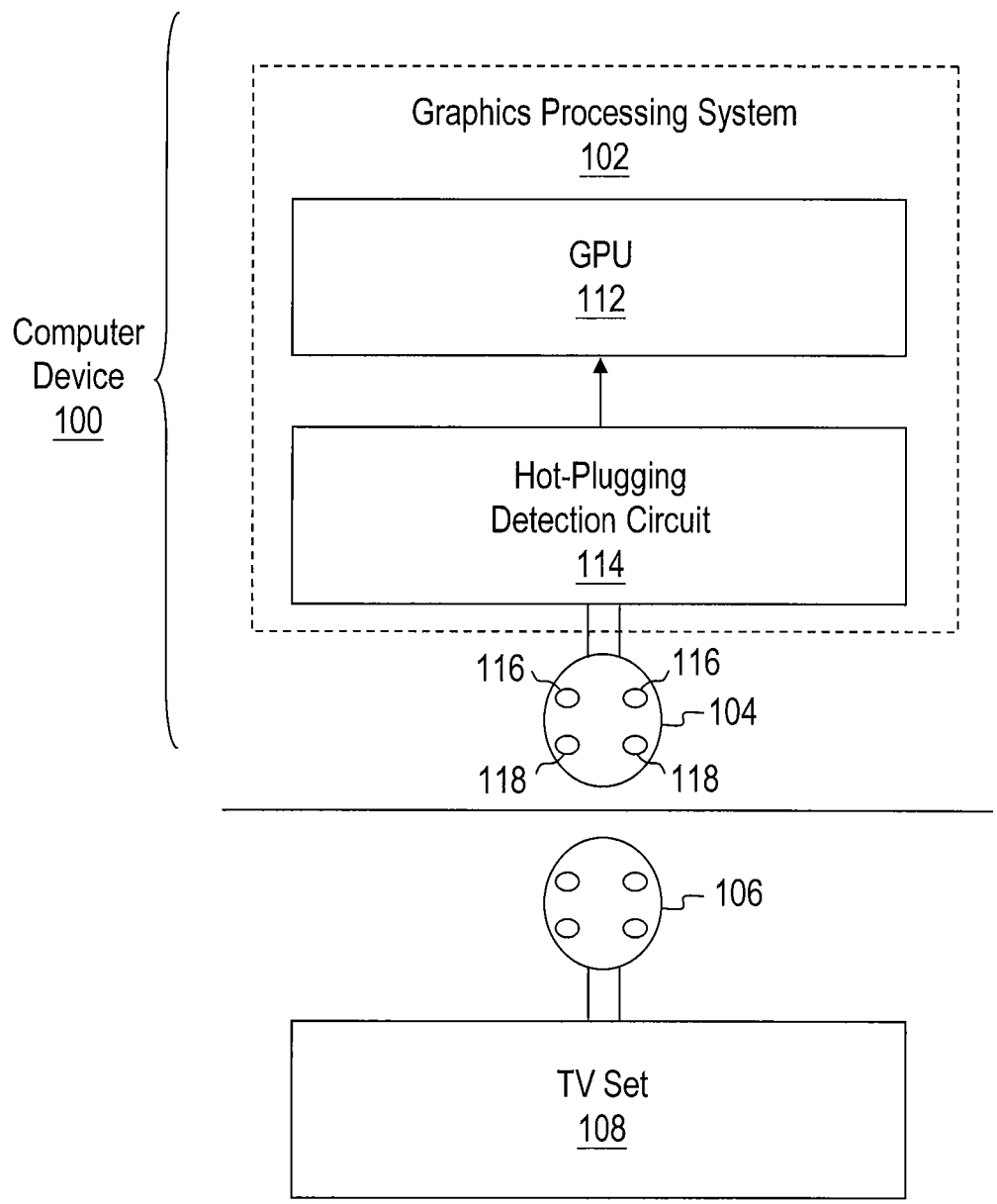
FIG. 1A is a schematic diagram illustrating a computer device 100 configured to implement one or more aspects of the present invention, according to one embodiment of the present invention.

FIG. 1A is a schematic diagram illustrating a computer device 100 configured to implement one or more aspects of the present invention according to one embodiment of the present invention. The computer device 100 comprises a graphics processing system 102 that is coupled to a video connector 104 adapted to receive the connection of a corresponding video connector 106 provided on a TV set 108. The graphics processing system 102 comprises a graphics processing unit (GPU) 112, and a hot-plugging detection circuit 114 coupled between the GPU 112 and the video connector 104. Suitable examples of the video connector 104 may comprise, without limitation, S-Video connectors, HDTV connectors, and like connectors having at least two ground pins. For the purpose of illustration, suppose the video connector 104 is an S-Video connector having four pins, i.e. two signal pins (luminance (Y) and chrominance (C)) 116 and two ground pins 118. One of the two ground pins 118 is used by the hot-plugging detection circuit 114 to detect a hot plugging of the video connector 106.

Figure 1B:
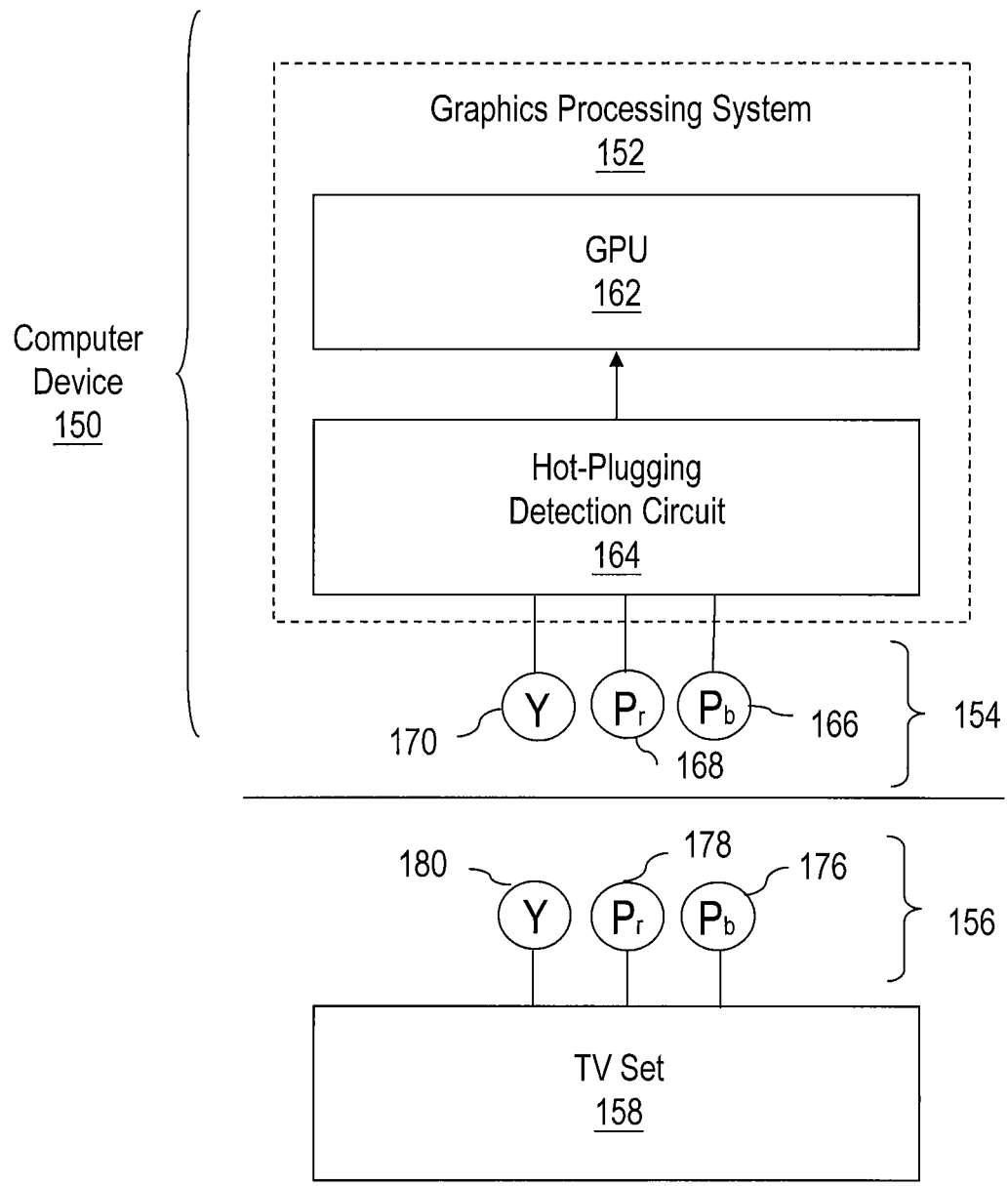
FIG. 1B is another schematic diagram illustrating a computer device 100 configured to implement one or more aspects of the present invention, according to another embodiment of the present invention.

FIG. 1B is another schematic diagram illustrating a computer device 150 configured to implement one or more aspects of the present invention according to one embodiment of the present invention. The computer device 150 comprises a graphics processing system 152 that is coupled to a video connector 154 adapted to receive the connection of a corresponding video connector 156 provided on a TV set 158. The graphics processing system 152 comprises a graphics processing unit (GPU) 162, and a hot-plugging detection circuit 164 coupled between the GPU 162 and the video connector 154. The video connectors 152 and 154 are HDTV connectors each having three signal pins (Y, Pb, and Pr) 166, 168, 170, 176, 178, and 180 and corresponding three ground pins.

Figure 2A:
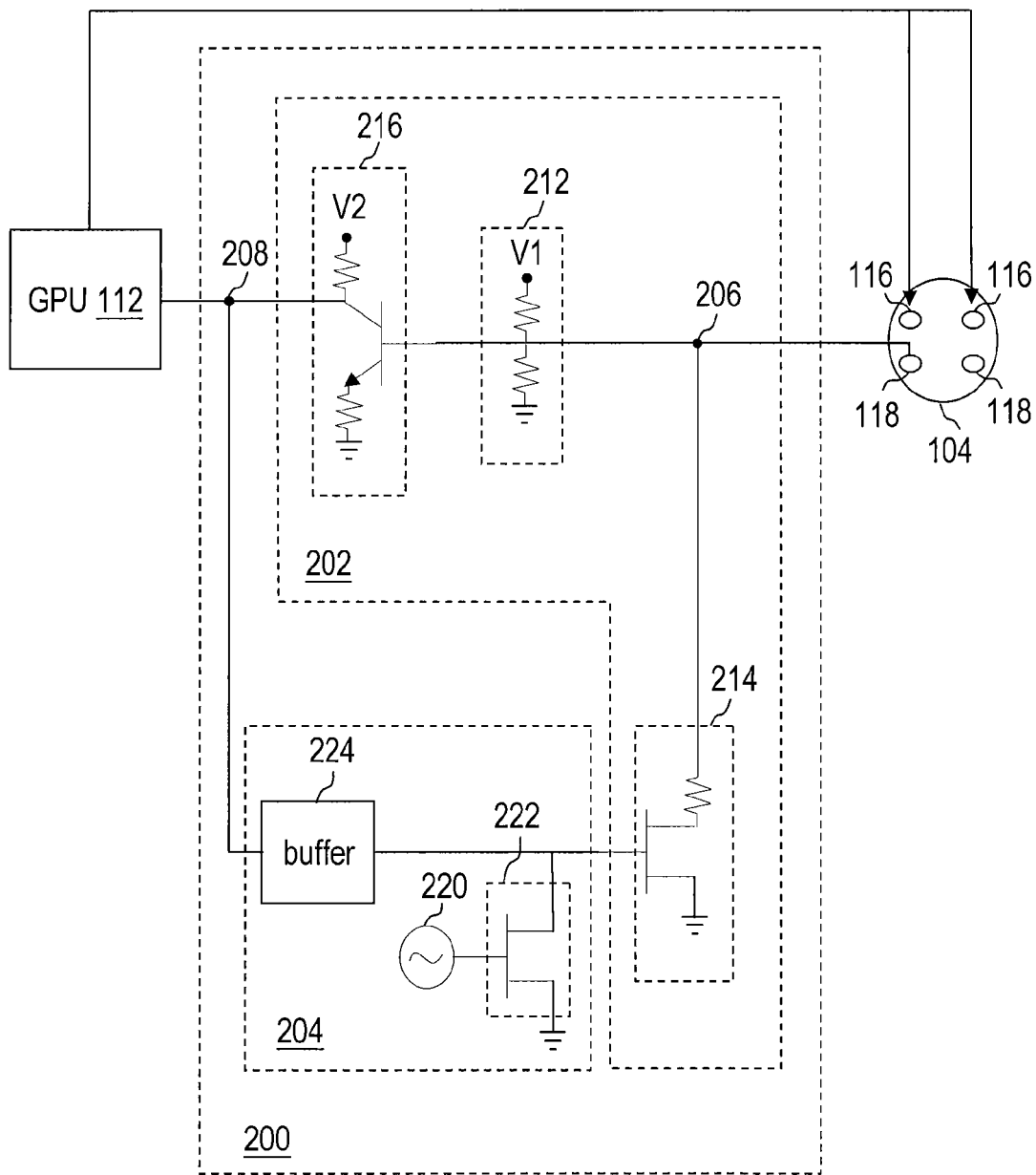
FIG. 2A is a schematic diagram of a hot-plugging detection circuit 200 configured to detect a hot plugging of a video connector provided in a computer device, according to an embodiment of the present invention.

FIG. 2A is a schematic diagram of a hot-plugging detection circuit 200 configured to detect a hot plugging of a video connector provided in a computer device, according to an embodiment of the present invention. The hot-plugging detection circuit 200 comprises a first circuit portion 202 and a second circuit portion 204. The first circuit portion 202 includes a sensing node 206 coupled to one ground pin 118 of the video connector 104, and a response node 208 coupled to the GPU 112. The first circuit portion 202 is configured to apply a reference voltage potential through the sensing node 206 to the coupled ground pin 118, and detect a change in the electrical state of the sensing node 206 in response to the occurrence of either hot plugging or unplugging of a TV set after the hot plugging. The electrical state at the sensing node 206 is translated into a corresponding electric signal at the response node 208 representative of a hot-plugging state of the video connector 104, i.e. the occurrence of hot plugging of the TV set and the unplugging of the TV set after the hot plugging.

As shown, the first circuit portion 202 comprises a voltage divider 212, a metal-oxide-semiconductor field effect transistor ("MOSFET") 214, and an inverter 216. The voltage divider 212 is coupled to a supply voltage V1 and comprises resistor elements to apply a predetermined reference voltage potential to the sensing node 206. The MOSFET 214 operates as a switch coupled between a ground and the sensing node 206 to selectively provide a grounding path to the ground pin 118 when the MOSFET 214 is turned on. The inverter 216, being coupled to a second supply voltage V2, has an input coupled to the sensing node 206 and an output coupled to the response node 208. In response to a connection or disconnection of a TV set, the inverter 216 is thereby adapted to translate a voltage change at the sensing node 206 into a corresponding electric signal at the response node 208 for representing an associated hot plugging state of the video connector 104.

The second circuit portion 204 is coupled between the MOSFET 214 and the response node 208. The second circuit portion 204 comprises an oscillator 220 adapted to apply periodic reset pulses via a transistor 222 to a gate of the MOSFET 214 so as to periodically turn off the MOSFET 214. A buffer 224 is coupled between the gate of the MOSFET 214 and the response node 208 so as to isolate the response node 208 from the effects induced by the periodic reset pulses applied by the oscillator 220.

In operation, when no TV set is hot plugged in, the sensing node 206 is set to the reference voltage potential applied through the voltage divider 212. In one embodiment, the voltage potential applied to the sensing node 206 may be about 1 volt. Accordingly, through the inverter 216, the response node 208 is set to a corresponding low voltage indicating an unplugging state of the video connector 104.

When a TV set is hot plugged into the video connector 104, the MOSFET 214 turns on to ground the coupled ground pin 118, so that the voltage potential at the sensing node 206 is about 0 volt, and the response node 208 is raised to a high voltage potential. By reading the high voltage potential at the response node 208, the GPU 112 is thereby notified of a hot plugging state of the video connector 104. The GPU 112 then can operate to switch on a digital-to-analog output (not shown) to transmit video signals through the signal pins 116 of the video connector 104 to the TV set.

Owing to the capacitance between the gate and the source of the MOSFET 214, the ON state of the MOSFET 214 is maintained, even after the TV set is actually removed. To ensure that a disconnection of the TV set can be detected, the oscillator 220 is configured to periodically apply a reset pulse to the MOSFET 214 to force a turnoff of the MOSFET 214. In one embodiment, the period of the reset pulse applied by the oscillator 220 may be about 1 second. When the TV set is hot plugged in, the reset pulses applied by the oscillator 220 will result in periodic ON-OFF switching of the MOSFET 214. However, the high voltage potential at the response node 208 is not affected owing to the buffer 224. As a result, the GPU 112 can still correctly read a hot plugging state from the response node 208.

When the TV set is unplugged from the video connector 104 after being hot plugged, the first circuit portion 202 is reset to an electrical state corresponding to an unplug state of the video connector 104 due to the reset pulses applied by the second circuit portion 204. In other words, the MOSFET 214 is turned off, the sensing node 206 recovers the reference voltage potential applied by the voltage divider 212, and the response node 208 is reset to a low voltage potential. By reading the low voltage potential from the response node 208, the GPU 112 is notified of the unplugging state of the video connector 104.

Figure 2B:
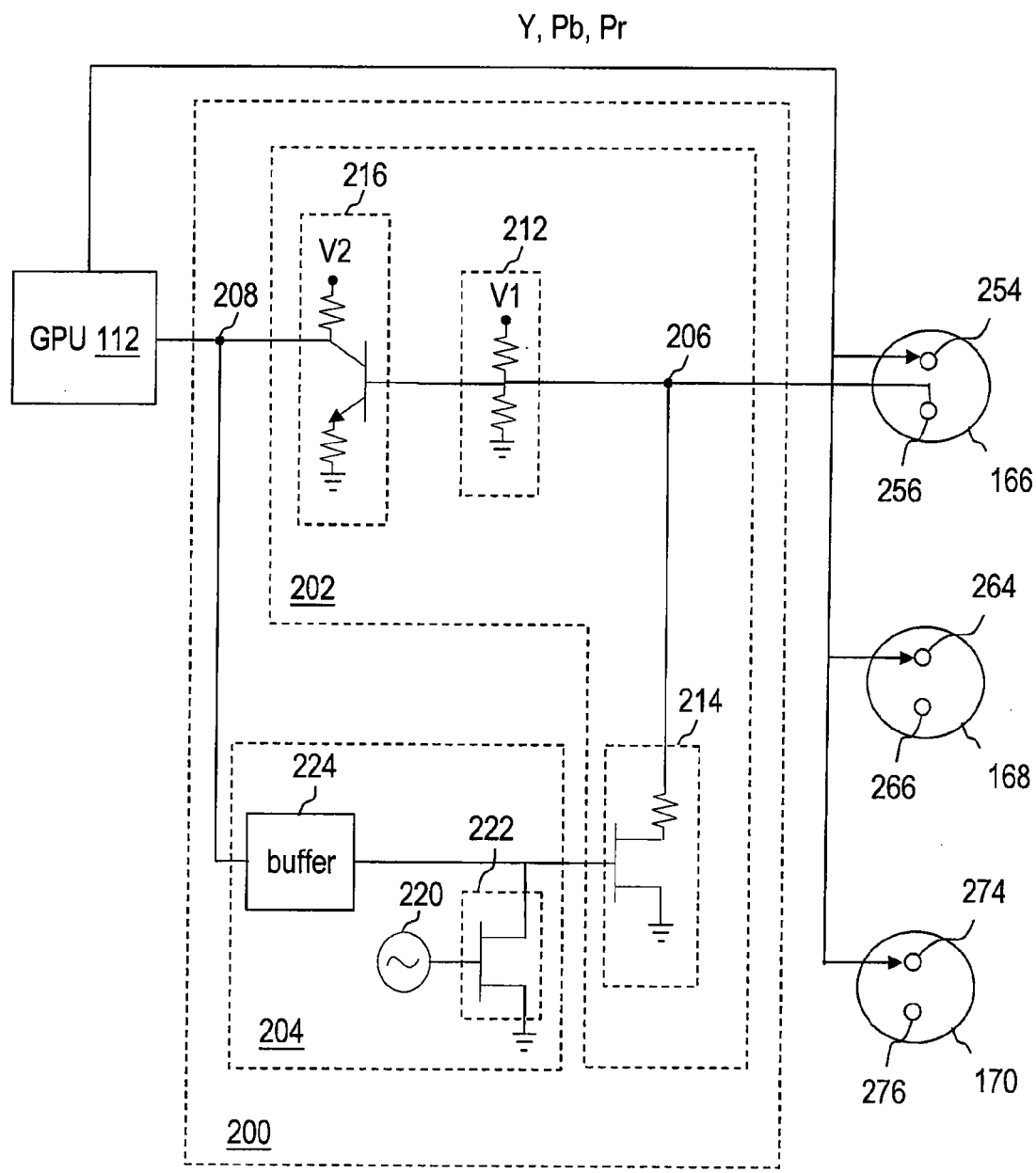
FIG. 2B is another schematic diagram of a hot-plugging detection circuit configured to detect a hot plugging of a video connector provided in a computer device, according to another embodiment of the present invention.

In conjunction with FIGS. 1B and 2A, FIG. 2B is another schematic diagram of a hot-plugging detection circuit 200 configured to detect a hot plugging of HDTV video connectors 166, 168, and 170 provided in a computer device, according to another embodiment of the present invention. The HDTV connectors 166, 168, and 170 have their own respective signal pins 254, 264, and 274, and respective ground pins 256, 266, and 276. The hot-plugging detection circuit 200 comprises a first circuit portion 202 and a second circuit portion 204. The first circuit portion 202 includes a sensing node 206 coupled to one ground pin 256, 266, or 276 of the HDTV video connector 166, 168, or 170, and a response node 208 coupled to the GPU 112. The first circuit portion 202 is configured to apply a reference voltage potential through the sensing node 206 to the coupled ground pin 256, 266, or 276, and detect a change in the electrical state of the sensing node 206 in response to the occurrence of either hot plugging or unplugging of a TV set after the hot plugging. The electrical state at the sensing node 206 is translated into a corresponding electric signal at the response node 208 representative of a hot-plugging state of the video connector 166, 168, or 170, i.e. the occurrence of hot plugging of the TV set and the unplugging of the TV set after the hot plugging.

As shown, the first circuit portion 202 comprises a voltage divider 212, a metal-oxide-semiconductor field effect transistor ("MOSFET") 214, and an inverter 216. The voltage divider 212 is coupled to a supply voltage V1 and comprises resistor elements to apply a predetermined reference voltage potential to the sensing node 206. The MOSFET 214 operates as a switch coupled between a ground and the sensing node 206 to selectively provide a grounding path to the ground pin 256, 266, or 276 when the MOSFET 214 is turned on. The inverter 216, being coupled to a second supply voltage V2, has an input coupled to the sensing node 206 and an output coupled to the response node 208. In response to a connection or disconnection of a TV set, the inverter 216 is thereby adapted to translate a voltage change at the sensing node 206 into a corresponding electric signal at the response node 208 for representing an associated hot plugging state of the video connector 166, 168, or 170.

The second circuit portion 204 is coupled between the MOSFET 214 and the response node 208. The second circuit portion 204 comprises an oscillator 220 adapted to apply periodic reset pulses via a transistor 222 to a gate of the MOSFET 214 so as to periodically turn off the MOSFET 214. A buffer 224 is coupled between the gate of the MOSFET 214 and the response node 208 so as to isolate the response node 208 from the effects induced by the periodic reset pulses applied by the oscillator 220.

In operation, when no TV set is hot plugged in, the sensing node 206 is set to the reference voltage potential applied through the voltage divider 212. In one embodiment, the voltage potential applied to the sensing node 206 may be about 1 volt. Accordingly, through the inverter 216, the response node 208 is set to a corresponding low voltage indicating an unplugging state of the video connector 166, 168, or 170.

When a TV set is hot plugged into the video connector 166, 168, or 170, the MOSFET 214 turns on to ground the coupled ground pin 256, 266, or 276, so that the voltage potential at the sensing node 206 is about 0 volt, and the response node 208 is raised to a high voltage potential. By reading the high voltage potential at the response node 208, the GPU 112 is thereby notified of a hot plugging state of the video connector 166, 168, or 170. The GPU 112 then can operate to switch on a digital-to-analog output (not shown) to transmit video signals through the signal pins 254, 264, and 274 of the video connector 166, 168, or 170 to the TV set.

Owing to the capacitance between the gate and the source of the MOSFET 214, the ON state of the MOSFET 214 is maintained, even after the TV set is actually removed. To ensure that a disconnection of the TV set can be detected, the oscillator 220 is configured to periodically apply a reset pulse to the MOSFET 214 to force a turnoff of the MOSFET 214. In one embodiment, the period of the reset pulse applied by the oscillator 220 may be about 1 second. When the TV set is hot plugged in, the reset pulses applied by the oscillator 220 will result in periodic ON-OFF switching of the MOSFET 214. However, the high voltage potential at the response node 208 is not affected owing to the buffer 224. As a result, the GPU 112 can still correctly read a hot plugging state from the response node 208.

When the TV set is unplugged from the video connector 166, 168, or 170 after being hot-plugged, the first circuit portion 202 is reset to an electrical state corresponding to an unplugging state of the video connector 166, 168, or 170 due to the reset pulses applied by the second circuit portion 204. In other words, the MOSFET 214 is turned off, the sensing node 206 recovers the reference voltage potential applied by the voltage divider 212, and the response node 208 is reset to a low voltage potential. By reading the low voltage potential from the response node 208, the GPU 112 is notified of the unplugging state of the video connector 166, 168, or 170.

Figure 3:
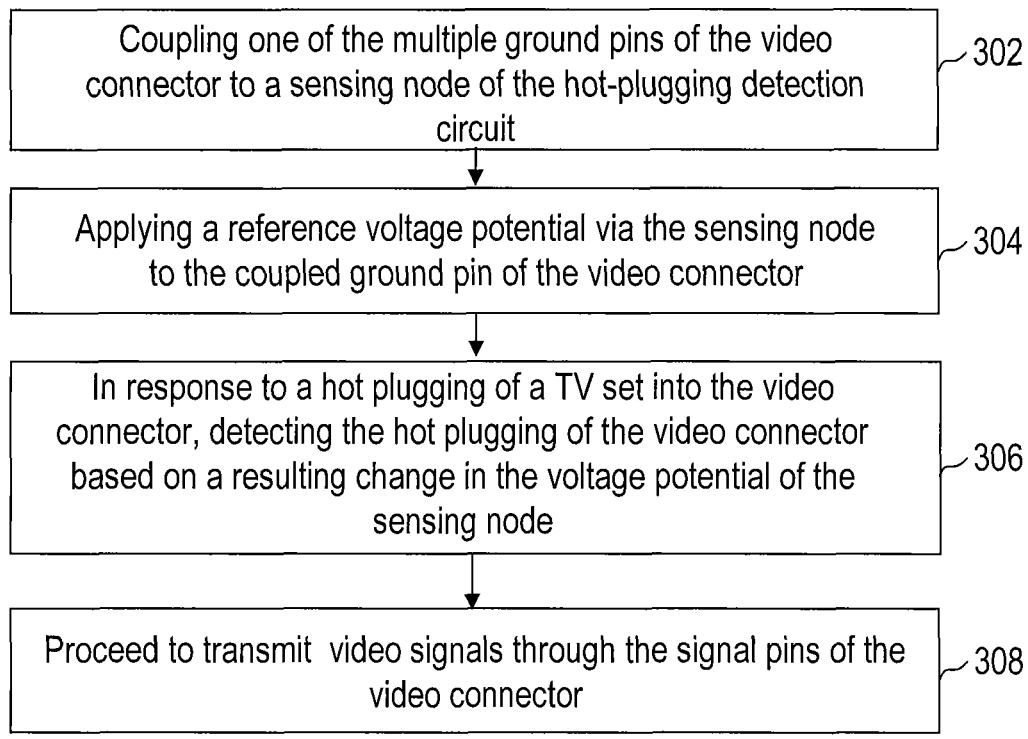
FIG. 3 is a flowchart that resumes method steps to detect a plug-in state of a video connector in a computer device according to an embodiment of the present invention.

In conjunction with FIG. 2A, FIG. 3 is a flowchart that resumes method steps to detect a hot-plugging of a video connector in a computer device according to an embodiment of the present invention. In initial step 302, one of the multiple ground pins 118 of the video connector 104 is coupled to the sensing node 206 of the hot-plugging detection circuit 200. In step 304, the hot-plugging detection circuit 200 is then configured to apply a reference voltage potential via the sensing node 206 to the coupled ground pin 118 of the video connector 104. In response to a hot plugging of a TV set into the video connector 104, the sensing node 206 in step 306 becomes grounded as the MOSFET 214 turns on, and this change in the voltage potential of the sensing node 206 is then translated through the hot-plugging detection circuit 200 into a corresponding high voltage at the response node 208 representative of a hot plugging state. In step 308, the notified GPU 112 can then proceed to transmit video signals through the signal pins 116 of the video connector 104 to the TV set.

Figure 4:
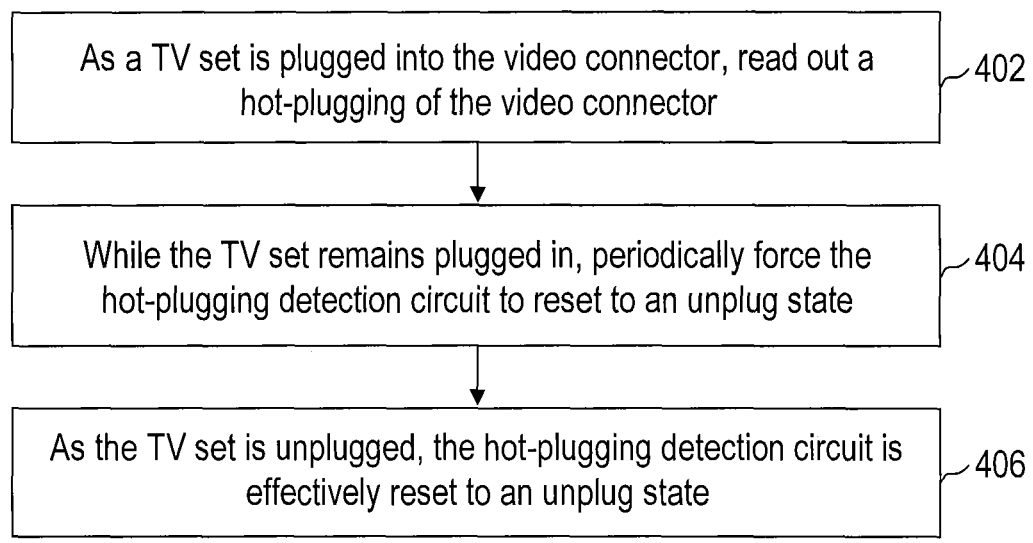
FIG. 4 is a flowchart of method steps to detect an unplug state of a video connector in a computer device according to an embodiment of the present invention.

In conjunction with FIG. 2A, FIG. 4 is a flowchart of method steps to detect an hot-plugging of a video connector in a computer device, according to an embodiment of the present invention. In initial step 402, as a TV set is hot plugged into the video connector 104, a hot plugging state of the video connector 104 is read from the response node 208 having a high voltage potential. In step 404, while the TV set remains hot plugged in, the second circuit portion 204 periodically applies a reset pulse to the MOSFET 214 to force a reset to an unplugging state. In step 406, as the TV set is not hot plugged, the MOSFET 214 effectively turns off due to the applied reset pulses, and the sensing node 206 recovers the reference voltage potential that is translated into a low voltage at the response node 208 representative of an unplugging state.

By adding a simple hardware circuitry coupled to a ground pin of the video connector, a hot plugging of a TV set and unplugging of a hot plugging TV set can thus be instantaneously detected in a cost effective manner without requiring computer rebooting or complex software detection.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A computer device comprising:
    a video connector;
    a processing unit; and
    a hot-plugging detection circuit coupled between the processing unit and a ground pin of the video connector, wherein the hot-plugging detection circuit includes a transistor switch electrically connected to the ground pin and a detection node that is at a first voltage level when the transistor switch is in a first state and at a second voltage level when the transistor switch is in a second state,
    wherein the processing unit determines a hot-plugging of the video connector based on the voltage level at the detection node.

2. The computer device of claim 1, wherein the processing unit comprises a graphics processing unit.

3. The computer device of claim 1, wherein the video connector comprises at least two ground pins.

4. The computer device of claim 1, wherein the hot-plugging detection circuit further includes a voltage divider electrically coupled to the ground pin and configured to apply a reference voltage to the ground pin generated from a first voltage source when the hot-plugging video connector is disconnected.

5. The computer device of claim 4, wherein the transistor switch is an inverter having an input coupled to the ground pin and an output coupled to the detection node.

6. The computer device of claim 5, wherein the hot-plugging detection circuit further includes inverter is a metal-oxide-semiconductor field effect transistor ("MOSFET") electrically coupled to the ground pin that is configured to selectively connect the ground pin to a ground potential when the video connector is connected.

7. The computer device of claim 5, wherein the output of the inverter is also coupled to a second voltage source and the second voltage source is coupled to a ground potential through the inverter.

8. The computer device of claim 6, wherein the hot-plugging detection circuit further includes a circuit portion configured to periodically apply an electrical pulse to switch the MOSFET from an ON state to an OFF state.

9. The computer device of claim 8, wherein the circuit portion comprises an oscillator and a buffer.

10. The computer device of claim 1, wherein the transistor switch is a metal-oxide-semiconductor field electric transistor (MOSFET) switch.

11. A method for instantaneously detecting a hot-plugging of a video connector provided in a computer device using a hot-plugging detection circuit coupled between a processing unit of the computer device and a ground pin of the video connector, the method comprising:

controlling a transistor switch of the hot-plugging detection circuit based on a voltage level at the ground pin of the video connector; and sensing a voltage level at a detection node to detect the hot-plugging of the video connector, wherein the voltage level at the detection node varies in accordance with a state of the transistor switch.

12. The method of claim 11, wherein the voltage level at the ground pin of the video connector is:

set to a reference voltage when the hot plugging video connector is disconnected; and set to a ground potential when the hot-plugging video connector is connected.

13. The method of claim 12, wherein the state of the transistor switch is changed when the voltage level at the ground pin is changed from the reference voltage to the ground potential.

14. The method of claim 13, wherein the ground pin is set to the ground potential through a switch element the transistor switch provided between the ground pin and the ground potential.

15. The method of claim 14, wherein the transistor switch element is periodically forced to turn off when the video connector is connected.

16. The method of claim 15, wherein the state of the transistor switch is changed when the voltage level at the ground pin is changed from the ground potential to the reference voltage.

17. The method of claim 16, wherein the state of the transistor switch is changed by allowing current to flow through the transistor switch when the voltage level at the ground pin is the reference voltage and inhibiting current to flow through the transistor switch when the voltage level at the ground pin is the ground potential.

18. The method of claim 11, wherein the video connector comprises at least two ground pins.

19. The method of claim 11, wherein the hot-plugging detection circuit is coupled between a graphics processing unit and the video connector.

20. The method of claim 11, wherein the transistor switch is a metal-oxide-semiconductor field electric transistor (MOSFET) switch.

\* \* \* \* \*